US006327006B1

United States Patent
Sato et al.

(10) Patent No.: US 6,327,006 B1
(45) Date of Patent: Dec. 4, 2001

(54) TFT-LCD HAVING SHIELDING LAYERS ON TFT-SUBSTRATE

(75) Inventors: Takusei Sato, Tokyo; Fumiaki Abe, Kanagawa; Yoshihiro Hashimoto, Kanagawa; Satofumi Koike, Kanagawa; Katsuhide Uchino, Kanagawa; Yuji Hayashi; Masayuki Iida, both of Kagoshima, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/427,735

(22) Filed: Oct. 27, 1999

(30) Foreign Application Priority Data

Oct. 28, 1998 (JP) .................................................. 10-307465

(51) Int. Cl.⁷ ...................................................... G02F 1/136
(52) U.S. Cl. ................................................... 349/44; 349/43
(58) Field of Search ................................. 349/43, 44, 110, 349/111, 138

(56) References Cited

U.S. PATENT DOCUMENTS

| | | | |
|---|---|---|---|
| 4,759,610 | * 7/1988 | Yanagisawa | 257/59 |
| 4,948,231 | * 8/1990 | Aoki et al. | 349/44 |
| 5,412,493 | * 5/1995 | Kunii et al. | 349/43 |
| 5,434,433 | * 7/1995 | Takasu et al. | 257/59 |
| 5,446,562 | * 8/1995 | Sato | 349/42 |
| 5,708,485 | 1/1998 | Sato et al. | 349/44 |
| 5,754,261 | * 5/1998 | Lyu | 349/44 |
| 5,811,866 | * 9/1998 | Hirata | 349/44 |
| 5,965,916 | * 10/1999 | Chen | 349/44 |
| 6,115,097 | * 9/2000 | Yamazaki | 349/111 |
| 6,124,903 | * 9/2000 | Iida | 349/44 |

FOREIGN PATENT DOCUMENTS 8-262494   3/1995   (JP) ................................ G02F/1/343

* cited by examiner

Primary Examiner—Toan Ton
(74) Attorney, Agent, or Firm—Rader, Fishman & Grauer

(57) ABSTRACT

A liquid crystal display device is so constructed that the scattered or reflected incident rays and even the return rays are prevented from entering the transistor part. The device is free from the problem of photoelectric current leakage. The device comprises an active substrate with a pixel transistor TFT thereon and a counter substrate that faces the active substrate via liquid crystal therebetween, wherein light-shielding layers (upper light-shielding layer, and lower light-shielding layer) are formed to be adjacent to the side of the pixel transistor part that faces the counter substrate and adjacent to the side thereof that faces opposite to the counter substrate and wherein the upper light-shielding layer and the lead electrode shield the entire region except the pixel openings from the incident rays that enter the device through the counter substrate.

11 Claims, 5 Drawing Sheets

CONSTITUTION OF EMBODIMENT 1 (CROSS SECTION)

PROBLEMS IN RELATED ART

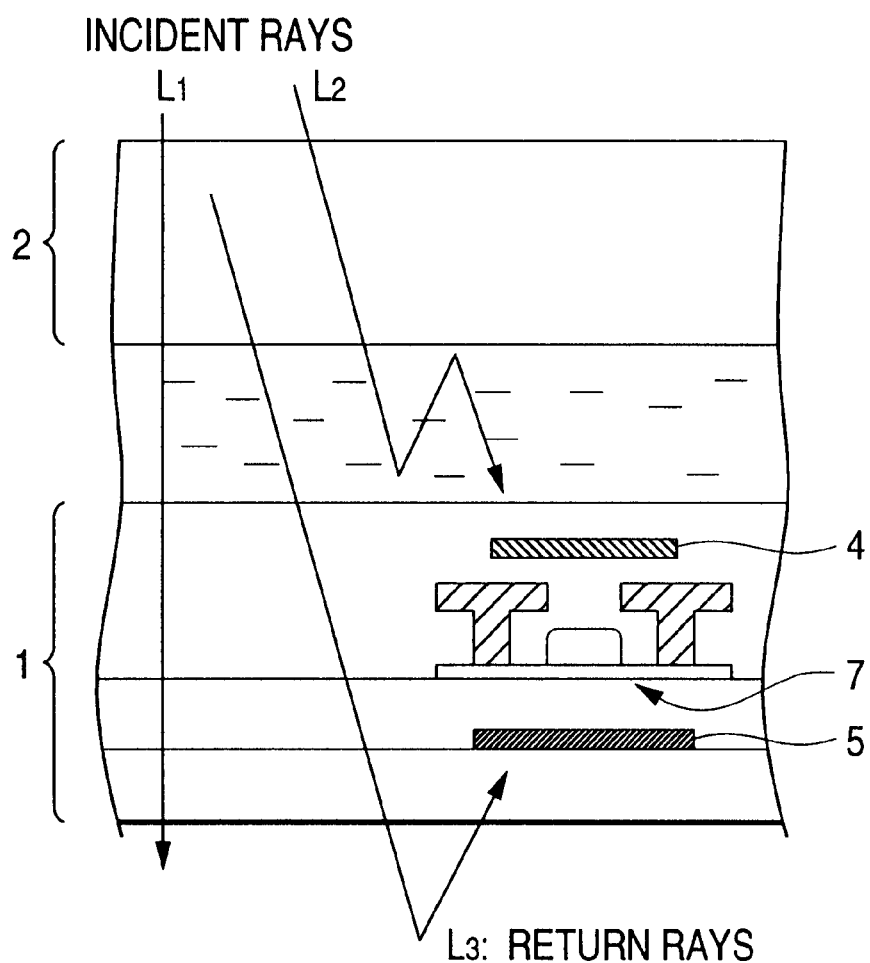

CONSTITUTION OF EMBODIMENT 1 (CROSS SECTION)

CONSTITUTION OF EMBODIMENT 1 (PLAN VIEW)

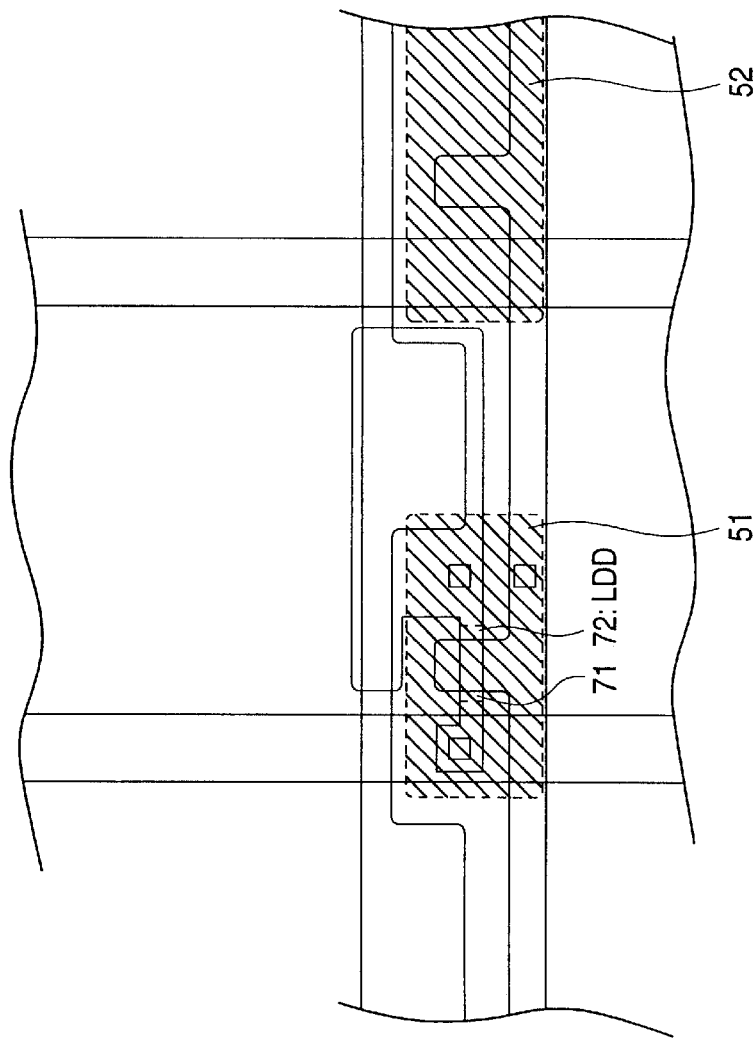

TFT-LCD HAVING SHIELDING LAYERS ON TFT-SUBSTRATE

BACKGROUND OF THE INVENTION

1. Field of the Invention

The present invention relates to a liquid crystal display device and more, precisely, to such device comprising an active substrate with a pixel transistor, TFT, thereon and a counter substrate facing the active substrate via liquid crystal therebetween.

2. Description of the Related Art

A liquid crystal display device has heretofore been known, which comprises an active substrate as prepared by forming a TFT (thin film transistor) on a substrate of, for example, glass or quartz, and a counter substrate that faces the active substrate via liquid crystal therebetween.

As a rule, the device of that type receives the rays from a light source through its counter substrate. The rays, if entering the pixel transistor in the device, will deteriorate image quality through contrast depression or flickering owing to photoelectric current leakage.

The sensitivity of polycrystalline Si (poly-Si) is not as high as compared with that of amorphous Si (a-Si). However, recent liquid crystal display devices with poly-Si-TFTs are often used in the presence of a large quantity of light, for example, as in projectors, and photoelectric current leakage is not negligible even in those devices with poly-Si-TFTs. Therefore, with the devices with poly-Si-TFTs, the problem of image quality deterioration through contrast depression or flickering owing to photoelectric current leakage comes into question.

One related technique of preventing ray penetration into the pixel transistor through the counter substrate comprises disposing a black matrix B adjacent to the counter substrate 2, as in FIG. 1A. As illustrated, the black matrix B acts to shield the pixel transistor from the incident rays. In this structure, however, it is impossible to prevent a part of the incident rays L2 having scattered or reflected, from entering the pixel transistor 7, even though the straight incident rays L1 could be blocked by the black matrix B. To overcome this problem, the present inventors previously proposed a technique of disposing a black matrix above the transistor on the side of the active substrate 1 facing the counter substrate 2, but not just below the counter substrate 2 to be adjacent thereto, as in FIG. 1B. In this structure, the black matrix is nearer to the transistor, by which the incident rays going into the transistor could be reduced more effectively (see Japanese Patent Laid-Open No. 262494/1996). As illustrated in FIG. 1B, the incident rays L2 having scattered or reflected could be prevented from entering the pixel transistor 7. In this proposal, the black matrix is in two sites, both acting as a light-shielding layer.

As shown, however, a part of the passing rays L3, having reflected in the optical system, produces return rays (stray rays) that enter the transistor through the active substrate. In any structure, it is impossible to prevent the return rays (stray rays) L3 from entering the transistor part 7.

In particular, in a liquid crystal display device with a top-gate-structured or planar-structured poly-Si-TFT, the active layer of the transistor is formed on the active substrate to be the lowermost layer thereon (opposite to the counter substrate). In this, therefore, the rays running toward the active substrate directly enter the active layer of the transistor, thereby causing photoelectric current leakage.

SUMMARY OF THE INVENTION

The present invention is to solve the problems noted above, and its object is to provide a liquid crystal display device in which the incident rays having scattered and reflected and even the return rays as above are prevented from entering the transistor part and which is therefore free from the problem of photoelectric current leakage.

The liquid crystal display device of the invention comprises an active substrate with a pixel transistor TFT thereon and a counter substrate that faces the active substrate via liquid crystal therebetween, wherein a light-shielding layer is formed both adjacent to the side of the pixel transistor part that faces the counter substrate and adjacent to the side thereof that faces opposite to the counter substrate and wherein the light-shielding layer that faces the counter substrate is in at least two sites relative to the incident rays running thereinto through the counter substrate so as to block all the incident rays toward the region except the pixel openings. Depending on its overlapping condition, the light-shielding layer that is in at least two sites is so constituted that it can block all rays toward the region except the pixel openings in the device.

According to the invention, the light-shielding layer is formed both adjacent to the side of the pixel transistor part that faces the counter substrate and adjacent to the side thereof that faces opposite to the counter substrate. Therefore, as graphically shown in FIG. 2, even the return rays (L3) can be blocked by the light-shielding layer (lower light-shielding layer 5) disposed on the side (light emitting side opposite to the counter substrate, and the device is not troubled by photoelectric current leakage to be caused by the rays erroneously entering the pixel transistor part.

BRIEF DESCRIPTION OF THE DRAWINGS

FIG. 2 is a graphical view showing the action of the device of the invention.

FIG. 5 is a plan view showing the constitution of the third embodiment of the invention.

DESCRIPTION OF THE PREFERRED EMBODIMENTS

Preferred embodiments of the invention are described concretely and in more detail with reference to the drawings. Naturally, however, the invention is not limited to the embodiments described and illustrated hereinunder.

Embodiment 1

Figure 1A:
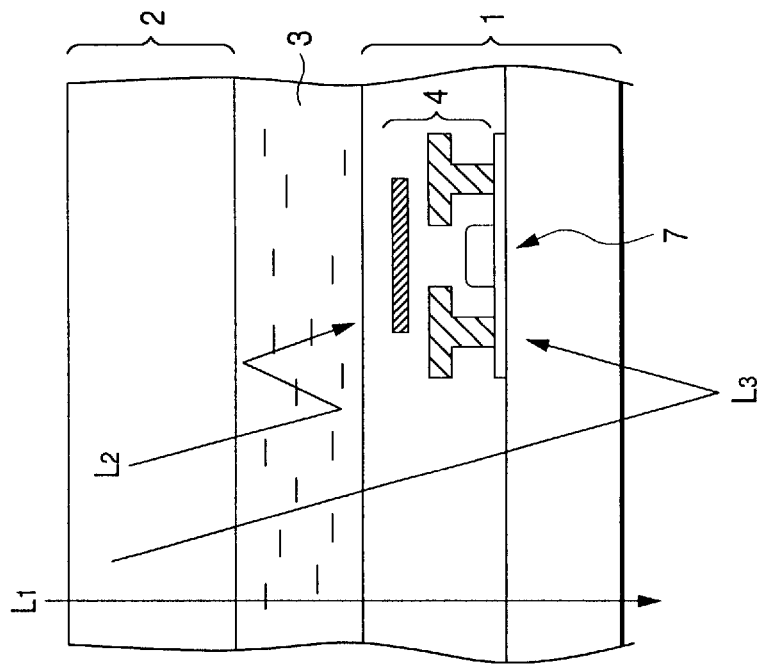
FIG. 1A and FIG. 1B are graphical views showing the problem in the related art.
Figure 1B:
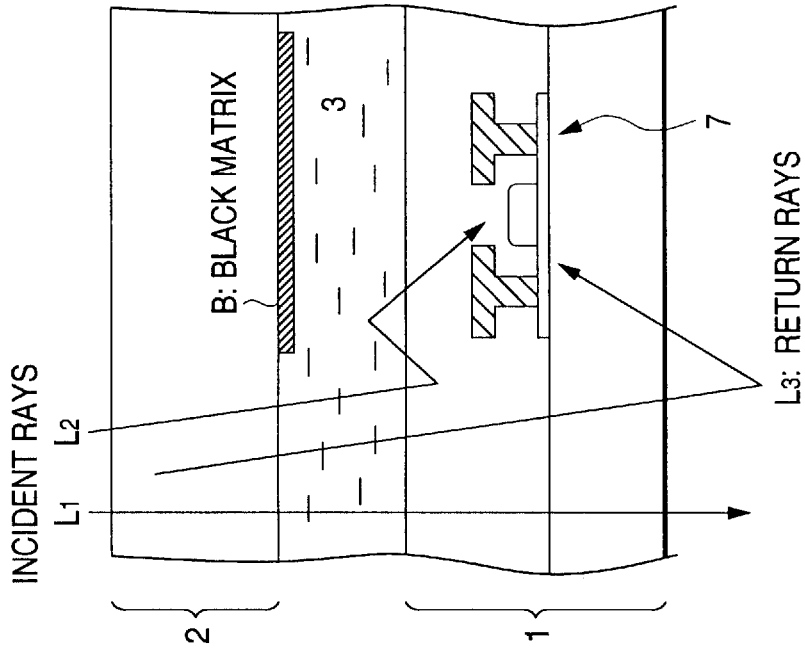
Figure 3:
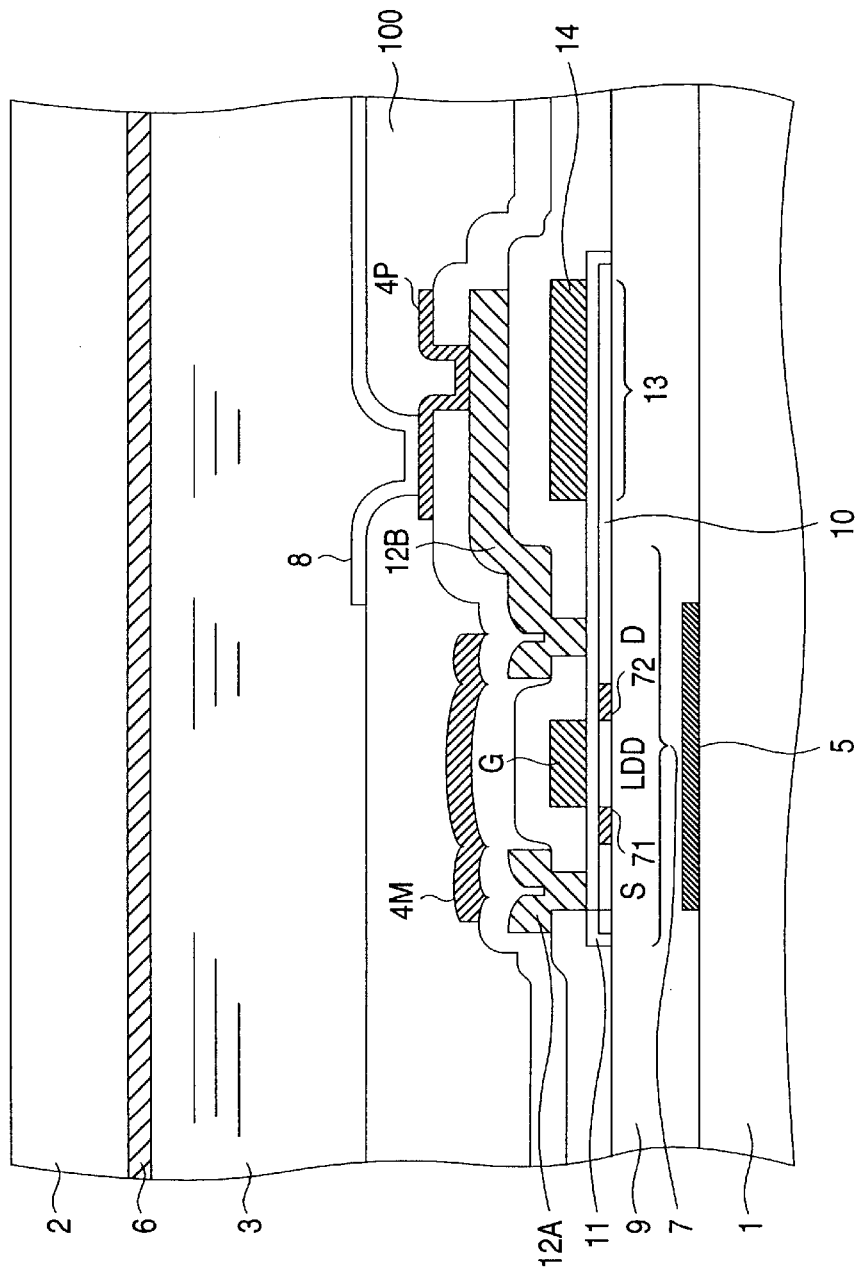
FIG. 3 is a cross-sectional view showing the constitution of the first embodiment of the invention.
Figure 4:
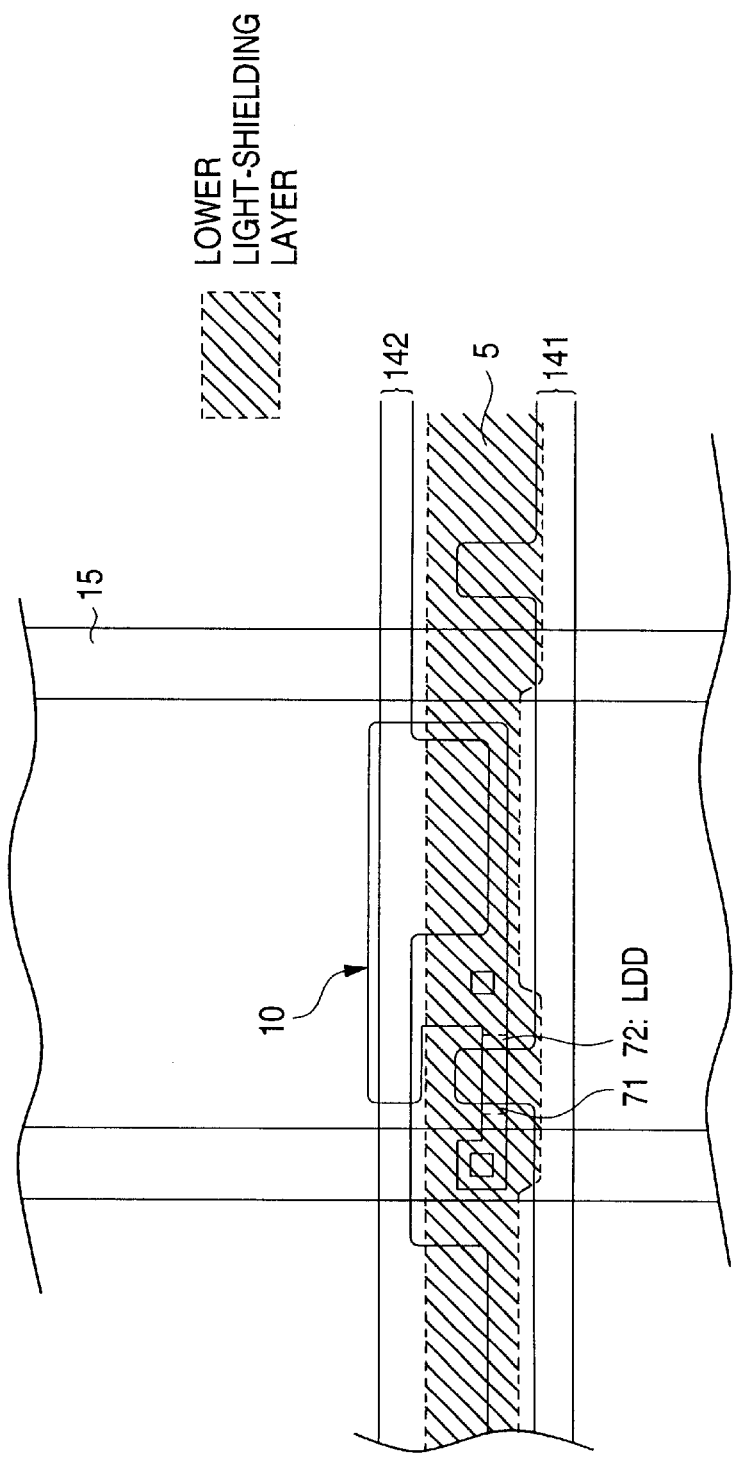
FIG. 4 is a plan view showing the constitution of the first embodiment of the invention.

The cross-sectional view and the plan view of the constitution of this embodiment are in FIG. 3 and FIG. 4, respectively. In the device of this embodiment, used is a high-temperature polysilicon TFT as the pixel transistor, which, however, is not limitative. Naturally, any other types of the device having, for example, a low-temperature polysilicon TFT or an a-silicon TFT could produce the same results as herein. (The same shall apply to the other embodiments to be mentioned hereunder.)

FIG. 3 is referred to. Therein illustrated is an active matrix-type liquid crystal display device of one embodiment of the invention. This comprises a substrate 1 with a pixel transistor TFT thereon (that is, the substrate 1 is of quartz, having the TFT thereon), and a counter substrate 2 of, for example, glass. A liquid crystal component 3 of, for example, twisted namatic liquid crystal is sandwiched between the substrate 1 and the counter substrate 2. The counter substrate 2 is provided with a counter electrode 6 of, for example, ITO.

The substrate 1 has a pixel electrode 8 of, for example, ITO, on a CMP-planarized layer 100 of, for example, an inorganic insulating film, while having a lower layer of TFT (thin film transistor) 7 below and adjacent to the layer 100. In this embodiment, the TFT 7 is a top-gate-structured TFT, acting as a switching element for driving the pixel electrode 8. In this embodiment, the TFT 7 has a thin semiconductor film 10 of polysilicon that acts as an active layer. The thin semiconductor film 10 is of a first polysilicon layer (1polySi). A gate G is formed on the thin semiconductor film 10 via a gate-insulating film 11 of $SiO_2$ or the like therebetween. The gate G is of a second polysilicon layer (2polySi). The TFT 7 has a source region S and a drain region D on both sides of the gate G. In this embodiment, the source region S and the drain region D both have an LDD region at their facing ends, and are connected with lead electrodes 12A and 12B, respectively. The lead electrodes 12A and 12B are made of, for example, an aluminium material of aluminium or the like.

The thin semiconductor film 10 has an auxiliary capacitance 13 (Cs) as formed therein. The auxiliary capacitance 13 (Cs) is formed of the first polysilicon layer (1polySi) that constitutes the thin semiconductor film 10 of TFT 7 and the second polysilicon layer (2polySi) that constitutes the thin semiconductor film 14 of gate G, via an insulating film of, for example, $SiO_2$ that constitutes the gate-insulating film 11 therebetween.

In the interlayer moiety between the upper layer moiety having the pixel electrode 8 and the lower layer moiety having the TFT 7, formed are light-shielding layers 4M and 4P. These light-shielding layers are so positioned above the TFT 7 as to face the counter substrate 2, that is, these are positioned on the side that receives the incident rays from a light source. As the case may be, they may be referred to as "upper light-shielding layers" or "first light-shielding layers". In this embodiment, the light-shielding mask layer 4M and the light-shielding pad layer 4P are the upper light-shielding layers, as illustrated. In that manner, the incident rays that enter the device through the counter substrate are completely blocked by the two upper light-shielding layers (the light-shielding mask layer 4M and the light-shielding pad layer 4P) and by the lead electrodes 12A and 12B, overlapping with each other, (these are made of aluminium herein) in all regions except the pixel openings. In this embodiment, the light-shielding mask layer 4M and the light-shielding pad layer 4P are both of a metal film of a conductive material of, for example, Ti or the like. The light-shielding mask layer 4M is patterned in series in the direction of pixel rows, at least partially shielding the TFT 7 from the rays running toward it. The light-shielding pad layer 4P is separately patterned for each pixel, being contacted with the pixel electrode. The light-shielding mask layer 4M, light-shielding pad layer 4P, and lead electrodes 12A and 12B, overlapping with each other, completely block the incident rays that enter the device through the counter substrate in all regions except the pixel openings.

On the other hand, another light-shielding layer 5 is formed below the pixel transistor part on the side opposite to the counter substrate. As the case may be, this may be referred to as a "lower light-shielding layer" or "second light-shielding layer". At least the facing source/drain edges in the pixel transistor are shielded from light by this lower light-shielding layer. In the thus-shielded source/drain edges, formed are the LDD regions 71 and 72 mentioned hereinabove.

In FIG. 4, the lower light-shielding layer 5 is specifically designated by the shadow area. In this, the reference numeral 10 indicates the first polysilicon layer for the pixel, 141 indicates the second polysilicon layer for the gate line, 142 indicates the second polysilicon layer for the auxiliary capacitance Cs, and 15 indicates a signal line (this made of aluminium.

In this embodiment, the lower light-shielding layer 5 is made of a high-melting-point metal silicide. For the layer 5, especially preferred is a film of WSi having a thickness of 200 nm.

The lower light-shielding layer 5 is so patterned herein that it may shield at least the region of the facing source/drain edges ±2.0 $\mu$m in the pixel transistor (TFT 7) from the rays running toward it. The lower light-shielding layer 5 is earthed to GND.

It is desirable that the region of the facing source/drain edges in the pixel transistor (TFT 7) to be shielded from the rays running toward it covers at least the edge of the gate G±0.5 $\mu$m, more preferably ±1.0 $\mu$m.

If desired, the lower light-shielding layer 5 may be so extended to the lower part below the channel region in the transistor moiety that it can integrally cover the channel region.

Moreover, where the lower light-shielding layer 5 is extended outside the pixel region in order to earth it to GND, the layer 5 may be extended to the region beyond the gate line of the pixel transistor. This is effective for relaxing the layer height difference in the pixel transistor structure and for reducing the stress to the gate line. The interconnection of that mode can be attained because the upper light-shielding layers noted above completely shield the pixel transistor in all regions except the pixel openings from the incident rays that enter the device.

In this embodiment, an insulating layer 9 of NSG having a thickness of 600 nm is layered over the lower light-shielding layer 5 through AP-CVD. Over the layer 9, further layered is polysilicon through LP-CVD. This is the first polysilicon layer (1polySi) for the thin semiconductor film 10, and forms the active layer for the TFT 7.

In order to attenuate the parasitic capacitance from the adjacent interconnections to the lower light-shielding layer 5, it is desirable that the lower light-shielding layer 5 and the pixel transistor-forming layer i.e., the (thin semiconductor film 10) are spaced by a thick film of the insulating layer 9 and that the film of the insulating layer 9 is as thick as possible like that discussed herein. As a rule, it is desirable that the thickness of the film of the insulating layer 9 is not smaller than 100 nm, more preferably from 200 to 1500 nm. In this embodiment, the insulating layer 9 is of NSG having a thickness of 600 nm as mentioned previously. Regarding its material, the insulating layer may be of an $SiO_2$ film, an SiN film or the like to be formed through LP-CVD, AP-CVD or p-CVD. Preferred are films of TEOS or HTO to be formed through LP-CVD, or NSG, PSG or BPSG to be formed through AP-CVD, or their laminates. After being formed, the insulating film 9 may be annealed for densifying its structure. Annealing the film 9 may be effected at 1000° C. for 60 minutes or so, by which the lower light-shielding layer 5 could be prevented from being deteriorated in the subsequent steps.

It is desirable that the lower light-shielding layer 5 has a low resistivity of not larger than 100 $\Omega$/square, more preferably not larger than 10 $\Omega$/square, in order not to be influenced so much by the coupling capacitance from the adjacent interconnections.

In order to prevent light leakage from the transistor, the lower light-shielding layer 5 shall have a transmittance of generally not larger than 50% at least for the light falling within a wavelength range of from 400 to 500 nm. Preferably, the transmittance through the layer 5 is not larger than 10%. More preferably, it is as small as possible, for ensuring higher light-shielding capabilities of the layer 5.

The thickness of the lower light-shielding layer 5 is not specifically defined, provided that the layer 5 satisfies the requirements for the resistance and the light-shielding ability as above. In practical use, the layer 5 may have a thickness of from 10 to 1000 nm, and preferably from 100 to 400 nm.

In consideration of the process conformity in forming the polysilicon transistor above the lower light-shielding layer 5, high-melting-point metals and compounds of such metals are preferred for the material for the lower light-shielding layer 5. For example, employable are W, Mo, Pt, Pd, Ti, Cr and their silicides.

On the other hand, for the upper light-shielding layers of mask layer 4M and pad layer 4P, preferred are conductive materials of, for example, metals such as titanium. Specifically, the light-shielding mask layer 4M shall have a fixed potential, which is, for example, equal to the potential of the counter electrode 6, while the light-shielding pad layer 4P shall be so interposed between the pixel electrode 8 and the lead electrode 12B as to enhance the electric connection between the two (see FIG. 3). These upper light-shielding layers could be so defined that their transmittance within a visible ray range of wavelength from 400 to 700 nm is not larger than 1%, preferably not larger than 0.1%. For the material for the layers, for example, employable are metals such as Cr, Ni, Ta, W, Al, Cu, Mo, Pt and Pd, in addition to Ti noted above, and also their alloys and silicides. The thickness of the layers is not specifically defined, provided that the layers satisfy the requirement for the intended light-shielding capabilities. In general, the layers may have a thickness of at least 50 nm. The light-shielding mask layer 4M and the light-shielding pad layer 4P may be made of the same material.

The pixel transistor may have a double-gate structure. In that case, at least two source/drain edges in both the signal line area and the pixel area shall be shielded from light.

Without being limited to the pixel transistor as herein, driving circuit transistors for driving pixel transistors could be shielded from light in the same manner as herein. The transistors shielded from light could be protected from photo-carriers.

Embodiment 2

This embodiment is the same as Embodiment 1, except that the lower light-shielding layer 5 is connected with the gate G in every stage.

Though the lower light-shielding layer 5 is spaced from the active layer of the pixel transistor via the thick insulating film 9 of an NSG film as formed through AP-CVD, it will have a weak gate influence on the active layer of the thin semiconductor film 10 (first polysilicon layer, 1polySi) in Embodiment 1. Therefore, when the layer 5 is earthed to GND as in Embodiment 1, the ON current running through the transistor will decrease in some degree. As opposed to that, the lower light-shielding layer 5 is connected with the gate G in this embodiment, and the ON current reduction in the transistor could be prevented.

Embodiment 3

The plan view of this embodiment is shown in FIG. 5. In this embodiment, the lower light-shielding layer 5 is spaced for each pixel unit into lower light-shielding layers 51, 52, . . . each corresponding to each pixel unit. Each lower light-shielding layer shall be enough for completely covering the LDD regions in each transistor and shielding them from light, as in Embodiment 1. In this embodiment, the lower light-shielding layers 51, 52, . . . are separately connected with the gate G in each pixel. The others are the same as in Embodiment 1.

As described hereinabove, the liquid crystal display device of the invention is so constructed that the scattered or reflected incident rays and even the return rays are prevented from entering the transistor part. Therefore, the device is free from the problem of photoelectric current leakage.

While the invention has been described in detail and with reference to specific embodiments thereof, it will be apparent to one skilled in the art that various changes and modifications can be made therein without departing from the spirit and scope thereof.

What is claimed is:

1. A liquid crystal display device comprising an active substrate with a pixel transistor thereon, said pixel transistor having a pixel opening and being formed on a pixel transistor-forming layer, a counter substrate that faces said active substrate and bonded thereto via a predetermined space there between, and a liquid crystal component sealed in said predetermined space, wherein said device includes;

a first light-shielding layer means, including layers in at least two sites, formed adjacent to the side of said pixel transistor that faces the counter substrate, and a second light-shielding layer formed adjacent to the side of said pixel transistor that faces opposite to the counter substrate, said first light-shielding layer means substantially shielding the entire region constituting said pixel transistor, except for the pixel opening, from the incident rays that enter the device through the counter substrate.

2. The liquid crystal display device as claimed in claim 1, wherein said pixel transistor is a thin film transistor (TFT).

3. The liquid crystal display device as claimed in claim 1, wherein at least the facing source/drain edges in said pixel transistor are shielded from light by said second light-shielding layer.

4. The liquid crystal display device as claimed in claim 3, wherein LDD regions are formed adjacent to the light-shielded source/drain edges.

5. The liquid crystal display device as claimed in claim 1, wherein said second light-shielding layer is earthed.

6. The liquid crystal display device as claimed in claim 1, wherein said second light-shielding layer is connected with a gate line.

7. The liquid crystal display device as claimed in claim 1, wherein said second light-shielding layer is formed below the pixel transistor-forming layer via an insulating film having a thickness of from 200 to 1500 nm therebetween.

8. The liquid crystal display device as claimed in claim 1, wherein said second light-shielding layer has a resistivity of not larger than 100 Ω/square.

9. The liquid crystal display device as claimed in claim 1, wherein said second light-shielding layer has a transmittance of not larger than 50% at least for the light falling within a wavelength range of from 400 to 500 nm.

10. The liquid crystal display device as claimed in claim 1, wherein said pixel transistor is a polycrystalline Si-TFT.

11. The liquid crystal display device as claimed in claim 1, wherein said first light-shielding layer means further includes at least one pixel transistor electrode.

* * * * *